United States Patent Office 3,122,569
Patented Feb. 25, 1964

3,122,569
HYDROGEN PEROXIDE EPOXIDATION OF OLEFINS IN THE PRESENCE OF A METAL OXIDE PERACID AND AN AMINE
Andrew J. Kaman, Barberton, Ohio, assignor, by mesne assignments, to Pittsburgh Plate Glass Company
No Drawing. Filed May 14, 1957, Ser. No. 658,923
6 Claims. (Cl. 260—348.5)

This invention deals with the preparation of epoxides and is more particularly directed to the epoxidation with hydrogen peroxide of olefinically unsaturated organic compounds.

Various methods are suggested in the literature for the epoxidation of olefinically unsaturated compounds, e.g. aliphatic or cycloaliphatic compounds containing a pair of carbon atoms linked by a double bond. These methods differ, depending upon the particular olefinically unsaturated compound which is to be epoxidized. Thus, ethylene is reacted in the vapor phase with air or oxygen to yield ethylene oxide. While this procedure is convenient for the preparation of ethylene oxide, its applicability is limited to treatment of ethylene and possibly other like olefins.

Another epoxidation involves reacting hydrogen peroxide with unsaturated ketones such as benzalacetophenone in the presence of sodium hydroxide. This process is apparently restricted in its effectiveness to epoxidation of but special unsaturates, notably unsaturated ketones containing a

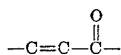

group.

Still a further process relies upon organic peracids, e.g. peracetic acid, for accomplishing epoxidation. Several drawbacks attend performance of processes relying upon organic peracids. One is the reactivity of organic acids with epoxides leading to ester formation. Use of processes based upon organic peracids provide for the simultaneous presence of organic acids and epoxides in the reaction system. Consumption of organic peracids in accomplishing epoxidation generates the corresponding organic acid. Also, one prevailing practice is the use of a solution of the organic peracid in an organic acid, e.g. an acetic acid solution of peracetic acid. Considerable by-product ester formation with correspondingly diminished yields of epoxides is to be anticipated. Another unattractive feature is the problem of preparing and regenerating the organic peracid. Reaction of hydrogen peroxide and an organic acid in formation of organic peracid is far from simple. Furthermore, important economics of this process is that the spent epoxidizing solution (organic peracid in organic acid) be recovered and reconverted to an organic peracid solution of adequate organic peracid concentration. Complications of this character detract from the attractiveness of epoxidations which rely upon organic peracids.

According to this invention, it now has been discovered that the efficient preparation of epoxides may be accomplished by bringing into reactive contact an olefinically unsaturated (ethylenic) compound susceptible of expoxidation and hydrogen peroxide in the presence of a peracid of a metal oxide such as pertungstic and an amine such as N-methylmorpholine. That is, epoxides are formed from a liquid medium of the olefinically unsaturated compound, hydrogen peroxide, amine and a peracid catalyst. In such process, the epoxidation proceeds quite readily and in high yields basis both the consumption of hydrogen peroxide and the olefinically unsaturated compound. Organic peracids such as peracetic acid are unnecessary, and hence, problems attendant to their use are avoided.

Formation of epoxides in recoverably high yields in the process of this invention is dependent upon the presence in the reaction medium of the amine and peracid catalyst during the reaction of hydrogen peroxide and olefinically unsaturated compound. If either the amine or catalyst is absent, experimental evidence indicates epoxides are not obtained. With amine present, but no catalyst, there is no apparent reaction. On the other hand, in the presence of catalyst but without amine, the oxidized products are other than epoxides.

The peracid of a catalytically active metal oxide apparently functions as a catalyst. Any suitable catalytic concentration suffices, usually on the order of 0.01 to 2 percent of the peracid by weight of the reaction medium. Larger concentrations do not offer pronounced additional benefits but concentrations of up to 10 percent by weight are within contemplation. Peracids of catalytically active metal oxides such as the oxides of titanium, zirconium, vanadium, tantalum, chromium, molybdenum, tungsten, uranium, ruthenium such as tungstic oxide, ruthenium tetroxide, vanadium tetroxide, molybdenum oxide or chromium trioxide. Other peracids of metallic oxides include those of heteropoly acids of the acid-forming elements of group VI of the periodic table, such as are described in United States Letters Patent 2,754,235, particularly the heteropolytungstic acids of sulfur, selenium or tellurium. Molybdotungstic and chromotungstic acids also are useful. Typical of heteropoly acids of tungsten which are effective are 12-tungsto-selenic acid, 6-tungsto-telluric acid, 12-molybdo-sulfuric acid, 12-molybdo-telluric acid, 9-molybdo-3-seleno-telluric acid and the like.

It will be understood it is in the peracid form that the metal oxide apparently functions as a catalyst. However, the metal oxide or heteropoly acid may be converted to this form in situ in the reaction medium by reaction with the hydrogen peroxide, or at least will function as to provide comparable catalytic properties.

An amine is necessarily present in the reaction medium for the formation of recoverable epoxides to be accomplished in this process. What precise function is performed by the amine is not quite clear, but nevertheless, it serves a demonstrated purpose. This beneficial influence is exerted even when it is present in minor concentration. Thus, formation of recoverable epoxides is accomplished with amine concentrations from 0.005 to 2 percent amine by weight of the reaction medium. Because of additional costs involved in use of higher amine concentrations, they are not usually employed, although they are functional.

The function contributed by the amine is not restricted to any specific amines, although some are more preferable depending among other things upon the particular ethylenic compound being epoxidized. Water soluble, amines, generally those of less than 15 carbon atoms, are recommended. Aliphatic amines, cycloaliphatic amines, aromatic amines and heterocyclic amines including primary, secondary and tertiary amines are within contemplation. Illustrative aliphatic amines include monomethylamine, dimethylamine, monoethylamine, diethylamine, triethylamine, diisopropylamine, diisobutylamine, propylene diamine, diethylene triamine, tetraethylenepentamine, propanolamine, propylene diamine, ethanolamine and triethanolamine. Among the aromatic amines are aniline, methylaniline, dimethylaniline, toluidine, xylidine, diphenylamine and phenylene diamine. Representative heterocyclic amines are pyridine, pyrrole, pyrrolidine, piperidine, morpholine, N-methylmorpholine, N-ethylmorpholine and lutidine. It is advantageous, but not essential, that the amine be chemically inert under the conditions of reaction.

In performance of this invention, an aqueous reaction medium is provided in which the amine, peracid catalyst (or catalytically active form thereof) hydrogen peroxide and olefinically unsaturated compound are included. Hydrogen peroxide and the unsaturate may be present in stoichiometric ratio or else either may be present in excess. These reaction mixtures may be established in any convenient manner, precautions preferably being exercised to avoid conditions which promote excessive decomposition of the components. Hydrogen peroxide is particularly sensitive to decomposition and is the component which requires most attention, usually by avoiding excessively high alkalinity. Many of the epoxide products are of sufficient instability, or have a tendency to be converted to other compounds, that reaction conditions are advisedly selected to avoid facilitating product degradation. Depending upon the specific epoxide, the tolerable conditions will naturally vary.

Reaction temperatures are between 0° C. and 100° C. as a rule. Somewhat lower temperatures, e.g. minus 15° C. or lower, which admit of a liquid reaction medium are, however, permissible. The particular temperature within this range which is optimum for preparation of a given epoxide varies. With epoxides that are heat sensitive, recourse to the lower temperatures is in order. Most frequently 0° C. to 70° C., or preferably 10° C. to 50° C. are representative generalizations regarding advisable temperatures.

According to a preferred embodiment, this process is eminently effective in epoxidizing olefinically unsaturated compounds in a reaction medium which has water as its sole solvent, exclusive of reactants and products. That is, the reaction medium is substantially free of inert organic diluents or solvents. The epoxides of olefinically unsaturated water soluble alcohols are prepared with particular facility and in highest yield from an aqueous solution originally consisting essentially of water, hydrogen peroxide, the alcohol, catalyst and water soluble amine.

Epoxidized with particular effectiveness in accordance with the preferred embodiment of this invention are olefinically unsaturated alcohols (the term alcohol including monohydric and polyhydric alcohols). These alcohols are mainly aliphatic and cycloaliphatic alcohols containing a pair of carbon atoms joined by a double bond (an olefinic or ethylenic group,

but not aromatic unsaturation such as in a benzene ring). Allylic alcohols, alcohols having a hydroxyl group attached to a carbon atom linked to a carbon atom of the pair joined by a double bond, containing the grouping:

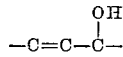

are converted in highest yield with most ease.

Illustrative unsaturated alcohols which may be converted in exceptionally high yield to their corresponding epoxy-substituted alcohols include olefinically unsaturated monohydric alcohols containing from 3 to 15 carbon atoms such as allyl alcohol, crotyl alcohol, methyl vinyl carbinol, methallyl alcohol, cyclopentenyl alcohol, cyclohexenyl alcohol and tetrahydrobenzyl alcohol as well as the corresponding unsaturated halogenated, notably chlorinated, alcohols. Polyhydric olefinically unsaturated alcohols are illustrated by 2-butene-1,4-diol, erythrol (3-butene-1,2-diol), cyclopentene-3,4-diol, cyclopentene-3,5-diol and 3,4-hexenediol-1,6.

The following examples illustrate the manner in which the present invention may be practiced to epoxidize olefinically unsaturated compounds:

EXAMPLE I

To a 200 milliliter glass flask containing 0.270 gram of tungstic acid ($H_2WO_4$) was added 17.9 grams of aqueous hydrogen peroxide containing 50.3 percent hydrogen peroxide by weight and 12.1 grams of water. This mixture was stirred for 30 minutes, and the catalyst was almost entirely solubilized. Some 86.4 grams of additional water was added, whereafter a total of 21.0 grams of cyclopentenol-3 containing 1.0 percent N-methylmorpholine by weight was added dropwise to the flask immersed in a water bath. Heat evolution occurred, the temperature rising to 30° C.

The reaction continued at room temperature, periodic analysis for unreacted hydrogen peroxide indicating essential completion of the reaction after 20.5 hours.

Isolation of product was achieved by removing the water by distillation at subatmospheric pressures of 60 to 65 millimeters of mercury pressure, followed by distillation of the product at 68° C. and 3 to 4 millimeters of mercury pressure. The crude product yield was 81 percent. Redistillation of the crude epoxide product was effected.

1,2-epoxycyclopentanol-3 was thus prepared. It had a boiling point of 78.0 to 78.5° C. at 6 millimeters mercury of pressure, a refractive index of $n_D^{20}$ 1.4750 and a density of $d_4^{20}$ 1.1634.

Epoxy analysis of this purified 1,2-epoxycyclopentanol-3 showed an oxirane content of 15.3 percent against a theory of 16.0 percent. The molecular refractivity of the compound was 24.22 against a calculated 24.27 (from atomic refractions).

Attempts to prepare the epoxide of cyclopentenol-3 following the above procedure but omitting either N-methylmorpholine or the tungstic acid were unsuccessful in that the epoxide product was not formed.

EXAMPLE II

To a three-neck 200 milliliter glass flask, equipped with a stirrer and immersed in a thermostatic bath, 0.270 gram (0.00108 mole) of tungstic acid ($H_2WO_4$) and 17.9 grams (0.265 mole) of an aqeuous hydrogen peroxide solution containing 50.3 percent by weight hydrogen peroxide and 12.1 grams of water were added. The resulting mixture was stirred for one hour while maintaining the temperature at 25° C. to 30° C. Thereafter, 0.25 mole of allyl alcohol containing 0.20 milliliter of N-methylmorpholine which had been preheated to 30° C. was added rapidly to the vigorously stirred mixture. Stirring was continued for 42 hours at 30° C. A yield of about 75 percent glycidol based on the allyl alcohol charged was obtained.

EXAMPLE III

Example II was duplicated except that 0.40 milliliter of N-methylmorpholine was included and the stirring period was 96 hours. The glycidol yield was about 61 percent basis the allyl alcohol charged.

EXAMPLE IV

Example II was duplicated except that 2.0 milliliters of N-methylmorpholine was included in the allyl alcohol and the mixture was stirred for 97 hours. The glycidol yield was 62.2 percent basis the allyl alcohol charged.

EXAMPLE V

The procedure of Example II was duplicated except that in lieu of N-methylmorpholine, 0.13 milliliter of pyridine was included in the allyl alcohol. After stirring for some 49 hours, the yield of glycidol was about 76 percent basis the allyl alcohol charged.

EXAMPLE VI

The procedure of Example II was duplicated except in lieu of N-methylmorpholine, 0.20 milliliter of triethylamine was employed and stirring was continued for 46 hours. The glycidol yield was about 77 percent basis the allyl alcohol charged.

EXAMPLE VII

The procedure of Example II was duplicated, employing in lieu of the N-methylmorpholine 0.16 milliliters of piperidine and stirring for 52 hours. The yield of glycidol was about 74 percent basis the charged allyl alcohol.

EXAMPLE VIII

Into a 200 milliliter three-neck round bottom glass flask were placed 0.270 gram (0.00108 mole) of tungstic acid ($H_2WO_4$), 16.9 grams (0.25 mole) of hydrogen peroxide as an aqueous hydrogen peroxide solution containing 50.3 percent hydrogen peroxide by weight and 10 grams of distilled water. After stirring the mixture 30 minutes, it was further diluted with distilled water until the total weight of the mixture was 130 grams. During the stirring period, the color of the reaction mixture changed from a bright yellow to a pale blue.

Stirring was continued for an additional one-half hour at which time 0.2 milliliter of N-methylmorpholine dissolved in an excess of the butenyl alcohol specified in the table below was added, dropwise, over a period of 10 minutes. By the use of a water cooling bath, the temperature was maintained below 30° C. The various epoxybutanols prepared in this manner were isolated by subjecting the reaction mixture to a vacuum distillation at 5 to 7 millimeters of mercury pressure and pot temperatures below 50° C.

The following table lists the specific reaction conditions and physical data relative to the resulting epoxybutanol prepared by employing various butenols:

*Table I*

| Butenol Charged | | | Epoxide Product | | | | |
| --- | --- | --- | --- | --- | --- | --- | --- |
| Name | Amount (Mole) | Reaction Time (Hours) | Name | Epoxide Isolated (Percent) | B.P. | | Index of Refraction $n_D^{20}$ |
| | | | | | ° C. | mm. Hg | |
| Crotyl Alcohol | 0.275 | 2 | 2,3-epoxy-butanol-1 | 83.2 | 47.5–48 | 5 | 1.4276 |
| Methyl Vinyl Carbinol | 0.375 | 24 | 1,2-epoxy-butanol-3 | 34.0 | 47 | 7 | 1.4291 |
| Methallyl Alcohol | 0.375 | 2 | 1,2-epoxy-2-methyl-propanol-3 | 55.5 | 42–43 | 6 | 1.4288 |

EXAMPLE IX 2-butene-1,4-diol was epoxidized in about 87 percent crude yield to 2,3-epoxybutanediol-1,4 by mixing at room temperature an aqueous solution containing 2.927 moles of the diol, 2.725 moles of hydrogen peroxide, 2.0 milliliters of N-methylmorpholine and 0.01 mole of tungstic acid. The hydrogen peroxide concentration was 8.2 percent by weight of the water. The reaction time was 3 hours during which the pH of the aqueous medium was between 5.0 and 5.4. Water was removed by vacuum distillation of 1 to 2 millimeters mercury pressure and a maximum pot temperature of 50° C. to obtain a crude product, 89 percent epoxide. A portion of this crude product was isolated and recrystallized from acetone and chloroform to obtain a 96.4 percent pure white crystalline product having a melting point of 46–50° C.

EXAMPLE X

Erythrol was epoxidized in good yield to 1,2-epoxybutanediol-3,4 by mixing for 20.5 hours at room temperature in a glass flask an aqueous solution containing 0.25 mole of erythrol, 0.265 mole of hydrogen peroxide, 0.20 milliliter of N-methylmorpholine and 0.001 mole of tungstic acid. In the reaction solution at the outset, the hydrogen peroxide concentration was 8.4 percent by weight of the water. During this mixing, the pH of the medium varied from 5.6 to 6.0. The epoxidation product 1,2-epoxybutanediol-3,4, was recovered from the aqueous medium by removing water using vacuum distillation at 1 to 2 millimeters mercury pressure and pot temperatures below 50° C.

EXAMPLE XI

The epoxides of cyclopentene-3,4-diol and cyclopentene-3,5-diol were produced simultaneously from an equimolecular mixture of these two cyclopentenediols in an aqueous solution containing 0.25 mole of the diol, 0.265 mole of hydrogen peroxide, 0.20 milliliter of N-methylmorpholine and 0.001 mole of tungstic acid which was stirred for 44 hours at room temperature. The crude yield of epoxidized cyclopentenediols was 58.8 percent. During the first 4 hours of this stirring, the pH of the reaction medium decreased gradually from 5.4 to 4.8. At the end of the stirring period, the reaction medium was at pH 3.4.

Besides these specified unsaturated compounds, other olefinically unsaturated compounds susceptible of epoxidation which have stable or relatively stable epoxides may be treated. Thus, methyl oleate and like esters of unsaturated organic acids, butadiene, cyclohexene and other olefinically unsaturated compounds may be handled.

EXAMPLE XII

In a three-neck 200 milliliter glass flask a mixture of 2.140 grams (0.00856 mole) of tungstic acid ($H_2WO_4$), 14.14 grams (0.210 mole) of aqueous hydrogen peroxide (50.5 percent $H_2O_2$ by weight) and 9.7 grams of distilled water were stirred for 30 minutes at 25° C. to 30° C. To this solution 55.9 grams of water and 1.3 milliliters of N-methylmorpholine were added. The solution pH was 5.3. Some 47.0 grams (0.419 mole) of tetrahydrobenzyl alcohol (3-cyclohexene-1-methanol) was added in several minutes while stirring vigorously to provide an emulsion reaction mixture at 25° C. to 30° C. After 2.5 hours, the pH was 4.8 and 26.5 percent of the hydrogen peroxide had reacted. An additional 0.4 milliliter of N-methylmorpholine was added raising the pH to 5.4. After 4.5 hours of reaction, the pH was 5.0 and 41.7 percent of the hydrogen peroxide had reacted. The pH was adjusted to 5.4 by adding 0.3 milliliter of N-methylmorpholine. After 21 hours, 92.4 percent of the hydrogen peroxide had reacted and the mixture was at pH 5. Analysis of the final reaction emulsion indicated a 48 percent yield of 3,4-epoxycyclohexane-1-methanol basis the hydrogen peroxide charged.

The final reaction mixture was treated with three 200 milliliter portions of methylene chloride which were combined, dried over magnesium sulphate, filtered and fractionally distilled under reduced pressure. Solvent removal was at a pot temperature below 30° C. The epoxide product was obtained after removal of excess tetrahydrobenzyl alcohol in the following fractions:

| Fraction | Weight, Grams | Boiling Point | | $n_D^{20}$ [1] |
| --- | --- | --- | --- | --- |
| | | ° C. | mm. Hg | |
| 1 | 19.7 | 67–74 | 2 | 1.4848 |
| 2 | 5.7 | 75–92 | 2 | 1.4852 |
| 3 | 3.9 | 93–101 | 2 | 1.4858 |
| 4 | 3.3 | 102–103 | 2 | 1.4860 |
| 5 | 2.7 | 102–103 | 2 | 1.4867 |
| Residue | 2.8 | | | |

[1] $n_D^{20}$ of tetrahydrobenzyl alcohol was 1.4854.

Fractions 4 and 5 were analyzed by the pyridine hydrochloride method and found to be 81 percent and 85 percent, respectively, pure epoxide.

This example illustrates the epoxidation of cyclohexene:

EXAMPLE XIII

Following the procedure of Example II, cyclohexene was substituted for allyl alcohol and a mixture of equal volumes of acetone and water was used in lieu of the added water. The mixture was stirred for 72 hours at 66° C. Cyclohexene oxide was prepared in this manner.

It will be understood that while epoxidations in the manner of this invention are ideally performed in a reaction medium having water as its sole inert component or diluent, other diluents may be included. Use of other diluents in conjunction with water is possible, but water alone as a diluent is preferred. Some such inert diluents include organic liquid solvents, preferably miscible with water, and inert under the reaction conditions. Included among the inert organic diluents are alcohols such as methanol, ethanol, isopropyl alcohol, tertiary butyl alcohol, ethylene glycol and diethylene glycol; ketones such as acetone, dimethyl ketone, diethyl ketone, methylpropyl ketone, diethyl ketone and methylethyl ketone; ethers such as diethyl ether, ethyl, propyl, butyl and amino dioxane, ethers of ethylene glycol and diethylene glycol; and other saturated organic solvents such as carbon tetrachloride, ethylene dichloride, chloroform and like halogenated hydrocarbons.

The following example illustrates the use of an organic reaction diluent:

EXAMPLE XIV

The procedure of Example I was followed except that sufficient water was replaced with ethanol to provide a liquid medium containing 57 weight percent ethanol basis the water and ethanol. After stirring for 150 hours, and distilling to recover 1,2-epoxycyclopentanol-3, a 54 percent yield of the epoxide basis the charged cyclopentenyl alcohol was obtained.

As indicated by these examples, the reaction proceeds at a rate such that several hours and longer (10 to 100 hours) are usually required for appreciable conversion to epoxide. During the first hours of the reaction, the epoxidation rate (or rate of epoxide formation) is highest. Hence, this process may be performed advantageously by limiting the period of reaction to that during which the epoxidation rate is high and recovering for further use the unused reactants.

Almost any strength hydrogen peroxide comprises a suitable raw material. Aqueous hydrogen peroxide solutions of 3 to 90 percent $H_2O_2$ by weight are typical, although the more concentrated hydrogen peroxide solutions require exercise of considerable care due to the hazards of explosion. For this reason, 3 to 60 percent hydrogen peroxide solutions are normally employed. In those instances which admit of organic solvents in the reaction medium, organic or aqueous organic hydrogen peroxide solutions are of use.

The epoxy alcohols herein provided are suitable for various purposes. For example, they are useful intermediates in the preparation of epoxy-substituted esters of silicon acids. These silicon acid esters are stabilizing agents, lubricants and monomers for the preparation of valuable polymeric products. Many of the epoxides such as glycidol are of recognized utility. Compounds such as 1,2-epoxycyclopentanol-3 are capable of homopolymerization by virtue of the epoxy group (as by heating in the presence of stannic chloride or other catalyst recognized for polymerization of the epoxy group) giving rise to polyether homopolymers useful as coating agents for metals such as iron, wood, woven textiles and wool. Epoxides of this type and others prepared by the present invention also are useful as the epoxide component in the preparation of epoxy resins. The epoxides are capable of hydrolysis, usually under mildly aqueous acidic conditions, to obtain polyols. In the case of the epoxides of monohydric alcohols, triols may be in this manner obtained. Such triols are useful cross-linking agents and polyesters of the type provided for condensation of diols such as glycol and dicarboxylic acids such as maleic acid. Presence of the triol facilitates preparation of three-dimension polyesters which are valuable as molding resins. These epoxides or their corresponding hydrolysis product are esterifiable with acetic acid, propionic acid or the like. Polyesterified products of this type are plasticizers for polyvinyl chloride and like materials. Illustrative of the resins that may be prepared using epoxides produced in accordance with the present invention is the following example:

EXAMPLE XV

Approximately 2 grams of the epoxide produced in accordance with Example I were heated with 2 grams of phthalic anhydride in a 200° C. bath. The resulting mixture was viscous and upon further heating, a resin was obtained which, after cooling, was hard.

As employed herein, the term "epoxide" refers to organic compounds containing a pair of connected carbon atoms, both of which are linked to the same oxygen atom according to the structure depicted as:

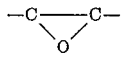

Epoxides are also termed oxirane compounds.

This application is a continuation-in-part of my prior filed application Serial No. 628,224, filed December 14, 1956, now abandoned.

While the present invention has been described with reference to specific details of certain embodiments, it is not intended that the invention be construed as limited to such details except insofar as they appear in the appended claims.

I claim:

1. The method of preparing an epoxide from an aqueous solution containing hydrogen peroxide, an epoxidizable water soluble olefinically unsaturated alcohol of 3 to 15 carbons and a catalytic concentration of a catalytically active peracid of a metal oxide which comprises including in the solution a water soluble amine having up to 15 carbon atoms, said solution in the absence of such amine being incapable of yielding epoxides, and consuming hydrogen peroxide and said alcohol in the formation of epoxide.

2. The method of claim 1 wherein the alcohol is a monohydric allylic alcohol.

3. The method of claim 1 wherein the alcohol is a dihydric allylic alcohol.

4. The method of claim 1 wherein the alcohol is allyl alcohol.

5. The method of claim 1 wherein the alcohol is cyclopentenol-3.

6. The method of claim 1 wherein the alcohol is a butenediol.

References Cited in the file of this patent

UNITED STATES PATENTS

| | | |
|---|---|---|
| 2,377,038 | Reichert | May 29, 1945 |
| 2,556,075 | Erickson | June 5, 1951 |
| 2,741,607 | Bradley et al. | Apr. 10, 1956 |
| 2,786,854 | Smith | Mar. 26, 1957 |
| 2,833,787 | Carlson et al. | May 6, 1958 |
| 2,833,788 | Skinner et al. | May 6, 1958 |